April 4, 1961 L. KRAUS 2,978,054
AXLE-DRIVE MECHANISM FOR MOTOR VEHICLES
Filed July 5, 1955 2 Sheets-Sheet 1

INVENTOR
LUDWIG KRAUS

BY Dicke and Craig

ATTORNEYS.

April 4, 1961 L. KRAUS 2,978,054
AXLE-DRIVE MECHANISM FOR MOTOR VEHICLES
Filed July 5, 1955 2 Sheets-Sheet 2

INVENTOR
LUDWIG KRAUS

BY *Dicke and Craig*
ATTORNEY

United States Patent Office 2,978,054
Patented Apr. 4, 1961

2,978,054
AXLE-DRIVE MECHANISM FOR MOTOR VEHICLES

Ludwig Kraus, Stuttgart-Rotenberg, Germany, assignor to Daimler-Benz Aktiengesellschaft, Stuttgart-Unterturkheim, Germany Filed July 5, 1955, Ser. No. 520,006

Claims priority, application Germany July 2, 1954

7 Claims. (Cl. 180—70)

The present invention relates to an axle-drive mechanism for motor vehicles, particularly for sport and race cars, and especially one to be used in combination with a speed transmission so as to form a unit therewith, the shaft driving the axle gearing or differential then crossing the transverse axis of the shaft or shafts of such gearing.

Prior to this invention, axle drive mechanisms have been known in which a drive shaft which connects the engine with the speed transmission crossed the transverse shafts of the axle gearing or differential, and in which the differential was driven directly by the transmission through bevel gears, helical gears, hypoid gears, or worm gears. However, when using a bevel gear drive, the extent of such use is limited since the axis of the driving shaft has to intersect the axis of the transverse shafts, whereas helical gears, hypoid gears, or worm gears have the disadvantage in having a relatively low efficiency, apart from the fact that those kinds of drives require the drive shaft to be disposed at least within a certain area relative to the transverse shafts.

It is now an object of the present invention to provide an assembly in which a driven shaft or transmission countershaft is interposed between the drive shaft and an intermediate transverse shaft, the transverse shaft driving the differential axle gear assembly by means of spur gears, resulting in an arrangement in which the distance between the drive shaft and the transverse axle shafts at their crossover point can be varied to any desired value without affecting the distance in a vertical direction between the drive shaft and the center line of the countershaft, and in which such a drive shaft furnishes a highly efficient drive.

An essential feature of the present invention consists in the provision of a drive shaft which drives an intermediate shaft by means of a pair of bevel gears, and wherein such intermediate shaft extends parallel to the transverse shafts and drives the axle gearing preferably consisting of a differential, or the transverse axle shafts, respectively, by means of a further gear connection, particularly a pair of spur gears. Because of the arbitrary position of the shafts within the axial distance thereof, the interposed pair of spur gears permits a relatively large vertical distance between the axes of the drive shaft and the transverse shafts, with the pair of bevel gears then insuring the change in driving direction of the gears without any noticeable loss in efficiency.

Further objects of the present invention reside in providing an assembly of a speed transmission and a differential whereby the available space and the weight of these elements are very suitably distributed over the motor vehicle, as well as in providing a very simple and easy method of installing the differential, the speed transmission, and the intermediate gears so as to form a single unit.

Another feature of the invention therefore resides in an axle drive in which the transmission which is combined with a rear axle gearing or differential is mounted behind the differential and driven by a drive shaft which, in turn, is driven by an engine at the front of the vehicle, and which preferably extends below the differential, crossing the same. Such an arrangement permits an easy assembly and easy accessibility of its individual parts, as well as a profitable use of the available space behind the rear axle which, in sport or race cars, is generally not utilized for any purpose. When using a front engine for driving an assembly as described, the further advantage of a balanced weight distribution will be obtained. If the speed transmission and the driving means thereof are mounted at a low level, it is also possible to obtain an unusually low center of gravity of the car.

According to the invention, the drive shaft for driving the speed transmission and the return shaft which connects the transmission with the differential are preferably disposed at a level lower than the center of the wheels or the axis of the transverse shafts, the return shaft then preferably being disposed in a vertical direction between the axis of the transverse shafts and the axis of the shaft driving the speed transmission. Thus a very low position of the drive shaft and a low center of gravity of the gear unit and of the entire car may be obtained. At the same time, the assembly may also be such that the drive shaft for driving the speed transmission be mounted so as to be coaxially with the main shaft thereof or to form an extension of such main shaft, and that the shaft which connects the transmission with the differential also forms the countershaft which is connected to the main shaft by a set of gears, or an extension of such countershaft. Furthermore, the shaft which drives the transmission may extend at a level below a brake drum which is mounted on the differential.

When the spur gears as previously mentioned are mounted at both sides of the differential, it is also possible to design the latter so as to be very narrow and of light weight. The pair of bevel gears, however, is preferably mounted so as to be easily accessible under a removable cover which especially facilitates an accurate adjustment of these gears.

Further objects, features, and advantages of the present invention will be apparent from the following detailed description thereof which is to be read with particular reference to the accompanying drawings, in which—

Figure 1:
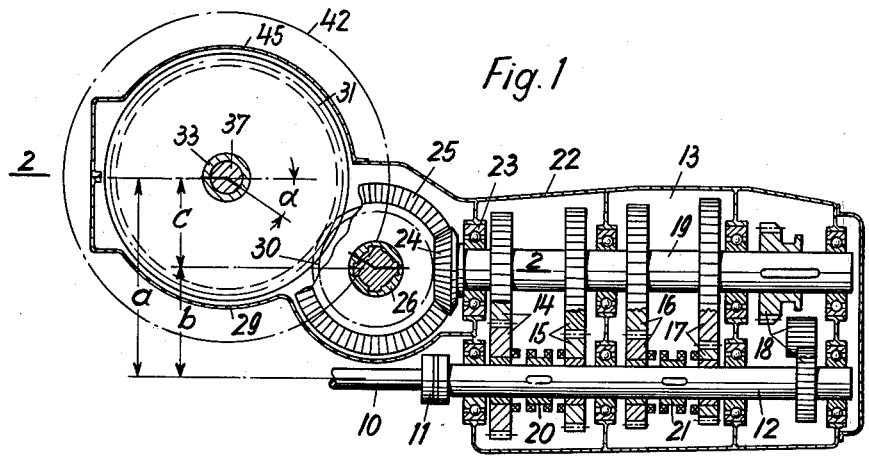
Fig. 1 shows a longitudinal cross section through the entire gear unit, particularly for driving the rear axle of a sport or racing car, such section being taken along line 1—1 of Fig. 2.

Referring to the drawings, the drive shaft 10 which is preferably connected to and driven by a front engine 50 drives the main shaft 12 of the speed transmission 13, for example, by means of a coupling 11. Main shaft 12 is adapted to be engaged with a countershaft or driven shaft 19 through four sets of gears 14, 15, 16, and 17 for several forward speeds, and through gears 18 for reversing the driving direction. Thus, for each of the forced transmitting trains through the transmission for forward speeds, only the two rotating shafts 12 and 19 and the intermeshing gears carried thereby are required. The forward speeds may be engaged by means of claw couplings 20 and 21 and the reverse speed by means of a sliding gear. The main and countershafts may each be mounted, for example, in four bearings within the housing 22 of the speed transmission 13. Adjacent the end bearing 23, the front end of countershaft 19 carries a bevel gear pinion 24 which meshes with the bevel gear 25 on the intermediate shaft 26. This intermediate shaft 26 is mounted at both sides of a spur gear 30 in bearings 27 and 28 in the lower part 29 of the housing of the differential which together with housing 22 of the transmission may form a single unitary casting. The larger spur gear 31 which is constantly in mesh with gear 30 and the shaft ends 32 and 33 which are mounted in bearings 34 and 35 preferably contains a differential gear or axle gearing, for example, a locking differential, the two driven gears which drive ends 32 and 33 of transverse axle shafts 36 and 37 being, in turn, in driving engagement with the cardan shafts 40 and 41 through universal joints 38 and 39. Shafts 36 and 37 may also carry a pair of brake drums 42 and 43, as indicated in the drawings.

Figure 2:
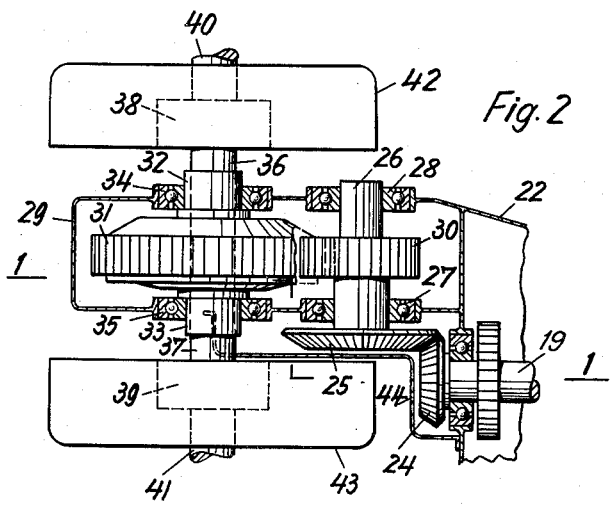
Fig. 2 shows a cross section taken along line 2—2 of Fig. 1.
Figure 3:
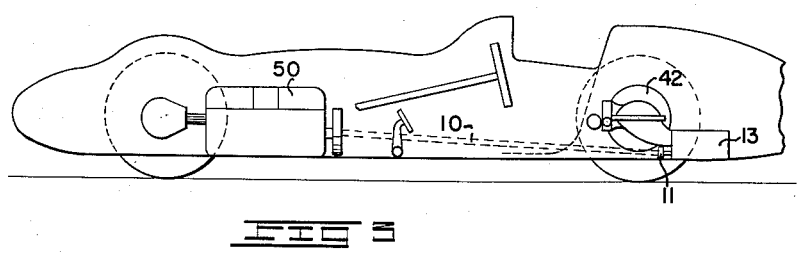
Figs. 3 and 4 are partial side and plan views of a vehicle according to the present invention illustrating the relationship of the engine, transmission and differential gearing.
Figure 4:
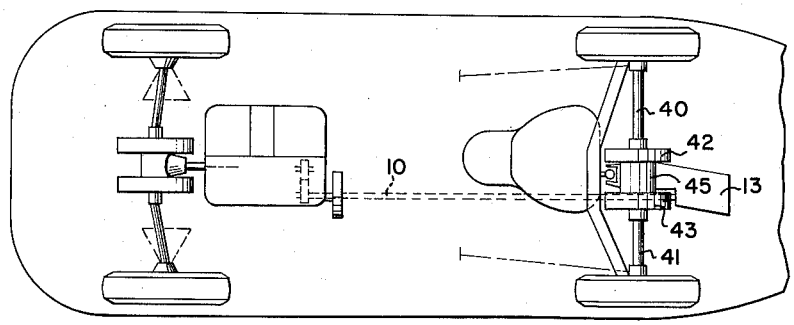

The bevel gears 24 and 25 which are disposed outside of housing 29 are provided with a removable cover 44 which is mounted on the common housing 22, 29 and allows easy access to the bevel gears 24 and 25, especially for adjusting the same. The bevel gears 24 and 25 are supported on free ends of their respective supporting shafts 19 and 26, the axes of these shafts intersecting at a point beyond each of these respective free ends as is seen clearly in Figure 2. The upper part of the differential is preferably enclosed by a separate housing 45.

As illustrated in the drawings, drive shaft 10 which is driven by the engine extends underneath the transverse axle shafts 36 and 37 and the axis of the differential and at a relatively large distance therefrom, the difference in level being determined on the one hand, by the distance $b$ between main shaft 12 and countershaft 19 and, on the other hand, by the distance $c$ between the countershaft 26 and the axis of the transverse shafts 36 and 37.

Since spur gear 30 is capable of engaging spur gear 31 at any desired angular position $\alpha$ with respect to a horizontal plane passing through the axis of the transverse axle shafts 36 and 37, the present invention permits the vertical distance $a$ between the drive shaft 10 and the transverse axle shafts 36 and 37 of the differential to be varied at will.

The addition of the intermediate spur gears 30 and 31 also permits a suitable speed reduction of the transverse axle shafts 36 and 37.

Although my invention has been illustrated and described with reference to the preferred embodiments thereof, I wish to have it understood that it is in no way limited to the details of such embodiments or to the specific examples described, but is capable of numerous modifications within the scope of the appended claims.

Having thus fully disclosed my invention, what I claim is:

1. A drive mechanism for a motor vehicle comprising a pair of oppositely extending axle shafts, a differential axle gearing interconnecting said shafts and having a central axis extending transversely with respect to the vehicle, a drive shaft driven by an engine on the vehicle and extending longitudinally of the vehicle and passing through a vertical plane of said axis at a level below said differential axle gearing, a speed change transmission extending in the longitudinal direction of said vehicle on the side of said axis opposite the vehicle engine, said transmission comprising a main shaft forming an extension of said drive shaft in general alignment therewith and a driven shaft extending parallel to said main shaft, selectively engageable gear means including a plurality of sets of gears for interconnecting said main and driven shafts, said driven shaft being above the main shaft and below the axle shafts, an intermediate transverse shaft extending parallel to the central axis of said differential axle gearing, a set of bevel gears interconnecting said driven shaft and said intermediate shaft, and gear means interconnecting said intermediate shaft and said axle gearing, said intermediate transverse shaft being disposed, with respect to a vertical direction, below said axle shafts intermediate said drive shaft and the central axis of said axle gearing, and, with respect to the longitudinal direction of the vehicle, intermediate said transmission and said differential axle gearing, said main and driven shafts of said transmission constituting the only rotatable shafts therein in the force transmission trains therethrough for forward speeds of the vehicle.

2. A drive mechanism for a motor vehicle comprising a pair of oppositely extending rear axle shafts, a differential axle gearing interconnecting said shafts and having a central axis extending transversely with respect to the vehicle, a drive shaft driven by an engine located on the forward end of the vehicle and extending longitudinally of the vehicle and passing through a vertical plane of said axis at a level below said differential axle gearing, a speed change transmission extending in the longitudinal direction of said vehicle on the side of said axis opposite the vehicle engine, said transmission comprising a generally horizontal main shaft forming an extension of said drive shaft and a driven shaft extending parallel to said main shaft, selectively engageable gear means including a plurality of sets of gears for interconnecting said main and driven shafts, said driven shaft being above the main shaft and below the axle shafts, an intermediate transverse shaft extending parallel to the central axis of said differential axle gearing, a set of bevel gears interconnecting said driven shaft and said intermediate shaft, and gear means interconnecting said intermediate shaft and said axle gearing, said intermediate transverse shaft being disposed, with respect to a vertical direction, below said axle shafts intermediate said drive shaft and the central axis of said axle gearing, and, with respect to the longitudinal direction of the vehicle, intermediate said transmission and said differential axle gearing, said drive shaft being offset transversely of the vehicle with respect to said differential axle gearing.

3. A drive mechanism for motor vehicles comprising a differential axle gearing including axle shaft means connected to said gearing, said axle shaft means including a pair of cardan shafts for driving a pair of oppositely disposed wheels of said vehicle, said axle gearing and said cardan shafts being generally coaxially arranged with respect to a central axis extending transversely with respect to the vehicle, a drive shaft driven by an engine and extending longitudinally of said vehicle and crossing said axle gearing underneath the same, a speed transmission disposed essentially in the longitudinal direction of said vehicle at one side of said axle gearing, said transmission extending essentially in the direction of said drive shaft, said transmission comprising a main shaft forming an extension of said drive shaft and a driven shaft extending parallel to said main shaft, an intermediate transverse shaft extending parallel to the central axis of said axle gearing, a set of bevel gears interconnecting said driven shaft and said intermediate transverse shaft, gear means connecting said intermediate shaft and said axle gearing, said intermediate transverse shaft being disposed in a vertical direction intermediate said drive shaft and the central axis of said axle gearing, and in a longitudinal direction of the vehicle intermediate said transmission and said differential axle gearing, and at least one brake drum mounted on said axle shaft means, said drive shaft extending underneath and past said brake drum with its axis being disposed within a vertical longitudinal plane passing through said brake drum.

4. A drive mechanism according to claim 3, including a common housing aggregate for enclosing each of said axle gearing, said transmission, said bevel gears and said gear means.

5. A drive mechanism according to claim 4, wherein said housing aggregate includes a detachable cover to provide access for adjustment of said bevel gears.

6. A drive mechanism for a motor vehicle comprising a pair of oppositely extending axle shafts, a differential axle gearing interconnecting said shafts and having a central axis extending transversely with respect to the vehicle, a drive shaft driven by an engine on the vehicle and extending longitudinally of the vehicle and passing through a vertical plane of said axis at a level below said differential axle gearing, a speed change transmission extending in the longitudinal direction of said vehicle on the side of said axis opposite the vehicle engine, said transmission comprising a main shaft forming an extension of said drive shaft in general alignment therewith and a driven shaft extending parallel to said main shaft, selectively engageable gear means including a plurality of sets of gears for interconnecting said main and driven shafts, said driven shaft being above the main shaft and below the axle shafts, an intermediate transverse shaft extending parallel to the central axis of said differential axle gearing, a set of bevel gears interconnecting said driven shaft and said intermediate shaft, and gear means interconnecting said intermediate shaft and said axle gearing, said intermediate transverse shaft being disposed, with respect to a vertical direction, below said axle shafts intermediate said drive shaft and the central axis of said axle gearing, and, with respect to the longitudinal direction of the vehicle, intermediate said transmission and said differential axle gearing, each of said intermediate transverse shaft and said driven shaft including axially spaced bearing means for rotatably supporting the respective shafts and each of said last-mentioned shafts having a free end extending beyond said bearing means, said free ends being adjacent to each other, said bevel gears being supported on the free ends of said intermediate and driven shafts, respectively.

7. A drive mechanism according to claim 6, further including a housing aggregate enclosing said differential axle gearing, said transmission, said intermediate shaft and the bevel gears and gear means connected to the intermediate shaft, said housing aggregate including a removable cover overlying said bevel gears and the free ends of said intermediate and driven shafts to provide convenient access for adjustment of said bevel gears.

References Cited in the file of this patent

UNITED STATES PATENTS

| | | |
|---|---|---|
| 1,695,296 | Robbins | Dec. 18, 1928 |
| 1,906,613 | Keese | May 2, 1933 |
| 2,057,140 | Ehrlich | Oct. 13, 1936 |
| 2,091,652 | Porsche | Aug. 31, 1937 |
| 2,232,154 | Wagner | Feb. 18, 1941 |
| 2,307,857 | Rodler | Jan. 12, 1943 |
| 2,645,299 | Vincent | July 14, 1953 |
| 2,755,875 | Muller | July 24, 1956 |
| 2,757,747 | MacPherson | Aug. 7, 1956 |
| 2,816,616 | Hill | Dec. 17, 1957 |

FOREIGN PATENTS

| | | |
|---|---|---|
| 500,863 | Great Britain | Feb. 16, 1939 |
| 507,895 | Great Britain | June 22, 1939 |